United States Patent
Tsai et al.

(10) Patent No.: US 11,546,897 B2
(45) Date of Patent: Jan. 3, 2023

(54) CONTROL INFORMATION FOR WIDEBAND OPERATION

(71) Applicant: MediaTek Inc., Hsinchu (TW)

(72) Inventors: Cheng-Rung Tsai, Hsinchu (TW); Jiann-Ching Guey, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 133 days.

(21) Appl. No.: 16/823,770

(22) Filed: Mar. 19, 2020

(65) Prior Publication Data

US 2020/0314810 A1 Oct. 1, 2020

Related U.S. Application Data

(60) Provisional application No. 62/909,818, filed on Oct. 3, 2019, provisional application No. 62/886,418, filed on Aug. 14, 2019, provisional application No. 62/825,075, filed on Mar. 28, 2019.

(51) Int. Cl.
*H04W 72/04* (2009.01)
*H04W 74/08* (2009.01)

(52) U.S. Cl.
CPC ..... *H04W 72/042* (2013.01); *H04W 74/0808* (2013.01)

(58) Field of Classification Search
CPC .......... H04W 72/042; H04W 74/0808; H04W 72/0453
See application file for complete search history.

(56) References Cited

U.S. PATENT DOCUMENTS

| 10,455,488 | B1* | 10/2019 | Bendlin | H04W 48/16 |
| 2018/0324788 | A1* | 11/2018 | Choi | H04L 5/005 |
| 2020/0021420 | A1 | 1/2020 | Li et al. | |
| 2020/0112978 | A1* | 4/2020 | Zhang | H04W 48/16 |
| 2020/0145972 | A1* | 5/2020 | Kwak | H04W 72/042 |
| 2021/0092622 | A1* | 3/2021 | Tiirola | H04L 1/0038 |
| 2021/0258816 | A1* | 8/2021 | Cai | H04B 17/336 |

FOREIGN PATENT DOCUMENTS

CN 110115087 A 8/2019

OTHER PUBLICATIONS

The International Search Report and the Written Opinion for PCT/CN2020/080573, dated May 27, 2020.
MediaTek Inc., Wideband operation for NR-U 3GPP TSG RAN WG1 #98bis R1-1911056, Oct. 20, 2019, sections 2-3.
Samsung, Wideband operation for NR-U 3GPP TSG RAN WG1 #96 R1-1902261, Mar. 1, 2019, sections 1-2.

* cited by examiner

Primary Examiner — John D Blanton
(74) Attorney, Agent, or Firm — Tong J. Lee

(57) ABSTRACT

A user equipment terminal (UE) operates in a wireless network according to a configuration. The UE receives the configuration for a physical downlink control channel (PDCCH), and detects downlink control information (DCI) in the PDCCH. From the DCI, the UE receives control information for a serving cell configured with one or more bandwidth units in a frequency domain. The control information is provided for each bandwidth unit of the serving cell. According to the control information, the UE performs a downlink reception from the serving cell or an uplink transmission to the serving cell.

16 Claims, 6 Drawing Sheets

CONTROL INFORMATION FOR WIDEBAND OPERATION

CROSS-REFERENCE TO RELATED APPLICATIONS

This application claims the benefit of U.S. Provisional Application No. 62/825,075 filed on Mar. 28, 2019, U.S. Provisional Application No. 62/886,418 filed on Aug. 14, 2019, and U.S. Provisional Application No. 62/909,818 filed on Oct. 3, 2019, the entirety of all of which is incorporated by reference herein.

TECHNICAL FIELD

Embodiments of the invention relate to wireless communications; more specifically, to the transmission of control information to a user equipment terminal (UE).

BACKGROUND

The Fifth Generation New Radio (5G NR) is a telecommunication standard for mobile broadband communications. 5G NR is promulgated by the 3rd Generation Partnership Project (3GPP) to significantly improve on performance metrics such as latency, reliability, throughput, etc. 5G NR supports operations in unlicensed spectrum (NR-U) to provide bandwidth to mobile users in addition to the mmWave spectrum. Some aspects of 5G NR may be based on the 4G Long Term Evolution (LTE) standard.

The 3GPP defined a coexistence mechanism for different radio air interfaces to share the unlicensed spectrum. For example, the unlicensed spectrum may be shared by a Wi-Fi network and a 5G NR network. To determine whether a channel is clear for transmission, a transmitting station performs a Clear Channel Assessment (CCA), such as a listen-before-talk (LBT) process, before signal transmission. In the LBT process, the transmitting station listens to (e.g., senses) a subband before transmission in that subband to determine whether the subband is idle or occupied by ongoing transmission activities. An LBT failure indicates that the subband is occupied. A transmitting station can start transmission in a subband when LBT succeeds for that subband, or waits until LBT succeeds for that subband.

The existing 5G NR technology can be further improved to benefit operators and users of the unlicensed spectrum. These improvements may also apply to other multi-access technologies and the telecommunication standards that employ these technologies.

SUMMARY

In one embodiment, a method is performed by a UE in a wireless network. The method comprises receiving a configuration for a physical downlink control channel (PDCCH); detecting downlink control information (DCI) in the PDCCH; and receiving, from the DCI, control information for a serving cell configured with one or more bandwidth units in a frequency domain. The control information is provided for each bandwidth unit of the serving cell. The method further comprises performing a downlink reception from the serving cell or an uplink transmission to the serving cell according to the control information.

In another embodiment, an apparatus is provided for wireless communication. The apparatus may be a UE. The apparatus comprises a memory and processing circuitry coupled to the memory. The apparatus is configured to perform the aforementioned method.

In yet another embodiment, a non-transitory computer-readable storage medium comprises instructions. The instructions, when executed by a machine, cause the machine to perform the aforementioned method for wireless communication.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a mechanism for providing control information to UEs in a wireless network. The control information may be part of downlink control information (DCI) carried in a physical downlink control channel (PDCCH). In one embodiment, the control information may indicate the frequency domain availability (a.k.a. channel availability) of one or more serving cells in a wireless network. In one embodiment, the control information may indicate channel availability of each subband configured for one or more serving cells in a wireless network. In the disclosure herein, a subband refers to a frequency channel for which a transmitting station performs an LBT process to assess the channel availability. An LBT success in a subband indicates that the subband is available for transmission and reception. LBT can be performed for each subband, which typically has a 20 MHz bandwidth or another pre-defined bandwidth.

In NR-U, a serving cell can be configured with an operating bandwidth greater than 20 MHz. When spectrum sharing is permitted by regulation (e.g., when the absence of Wi-Fi cannot be guaranteed) in a given operating bandwidth, a clear channel assessment (CCA) can be performed in units of 20 MHz. For example, if a serving cell is configured with an operating bandwidth of 80 MHz, the LBT process is performed per 20 MHz subband for the operating bandwidth. Depending on the LBT outcome, a transmitting station in the serving cell can occupy the subband(s) whose LBT is successful for a particular period of time.

The disclosed method, as well as the apparatus and the computer product implementing the method, can be applied to wireless communication between a base station (e.g., a gNB in a 5G NR network) and UEs. The indications of frequency domain availability enable a UE to receive signals in the available bandwidths. As such, the UE may skip receptions in those bandwidths not available in the frequency domain.

Figure 1:
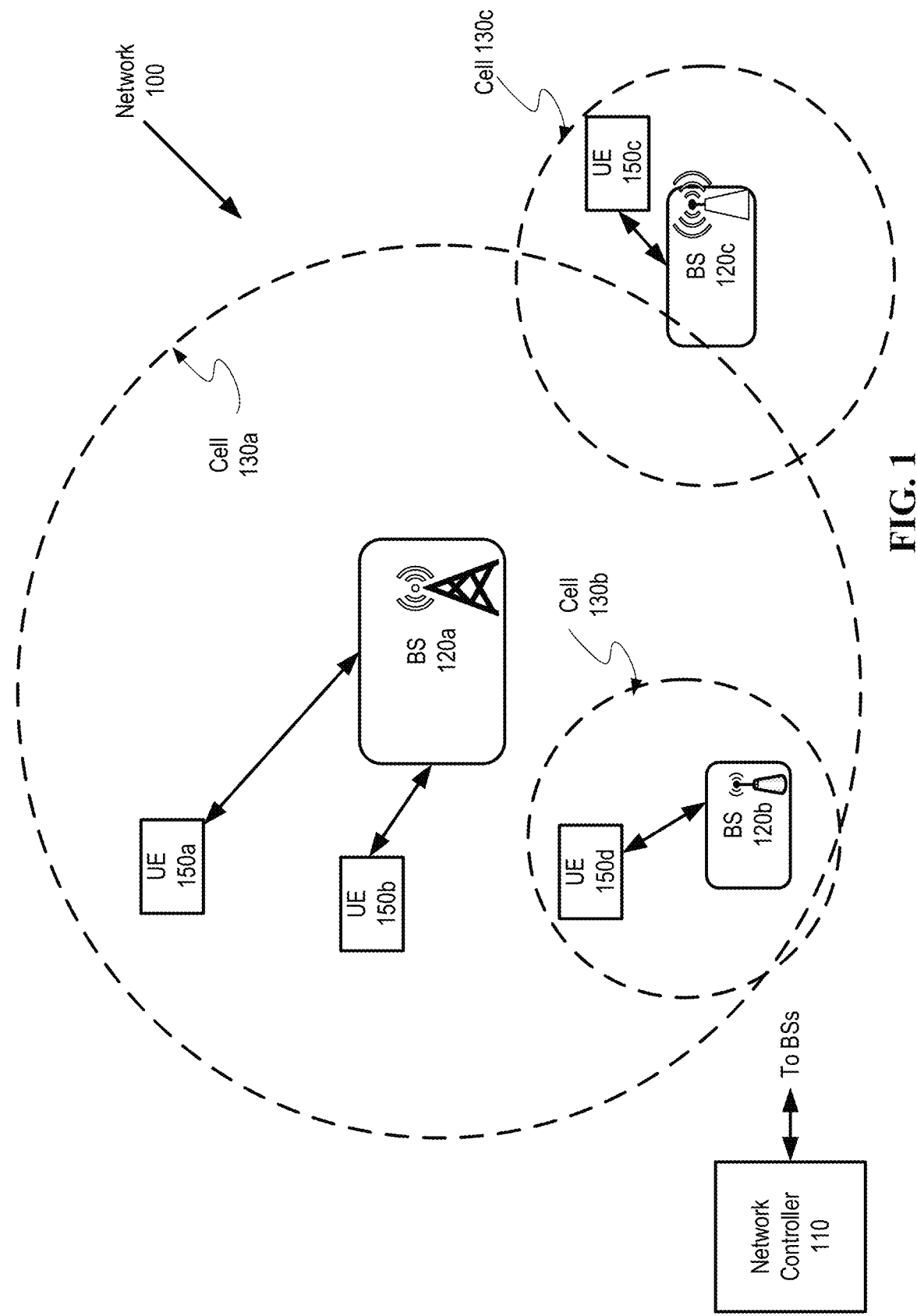
FIG. 1 is a diagram illustrating a network in which the embodiments of the present invention may be practiced.

FIG. 1 is a diagram illustrating a network 100 in which embodiments of the present invention may be practiced. The network 100 is a wireless network which may be a 5G NR network. To simplify the discussion, the methods and apparatuses are described within the context of a 5G NR network. However, one of ordinary skill in the art would understand that the methods and apparatuses described herein may be applicable to a variety of other multi-access technologies and the telecommunication standards that employ these technologies.

The number and arrangement of components shown in FIG. 1 are provided as an example. In practice, the network 100 may include additional devices, fewer devices, different devices, or differently arranged devices than those shown in FIG. 1.

Referring to FIG. 1, the network 100 may include a number of base stations (shown as BSs), such as base stations 120a, 120b, and 120c, collectively referred to as the base stations 120. In some network environments such as a 5G NR network, a base station may be known as a gNodeB, a gNB, and/or the like. In an alternative network environment, a base station may be known by other names. Each base station 120 provides communication coverage for a particular geographic area known as a cell, such as a cell 130a, 130b or 130c, collectively referred to as cells 130. The radius of a cell size may range from several kilometers to a few meters. A base station may communicate with one or more other base stations or network entities directly or indirectly via a wireless or wireline backhaul.

A network controller 110 may be coupled to a set of base stations such as the base stations 120 to coordinate, configure, and control these base stations 120. The network controller 110 may communicate with the base stations 120 via a backhaul.

The network 100 further includes a number of UEs, such as UEs 150a, 150b, 150c and 150d, collectively referred to as the UEs 150. The UEs 150 may be anywhere in the network 100, and each UE 150 may be stationary or mobile.

The UEs 150 may also be known by other names, such as a mobile station, a subscriber unit, and/or the like. Some of the UEs 150 may be implemented as part of a vehicle. Examples of the UEs 150 may include a cellular phone (e.g., a smartphone), a wireless communication device, a handheld device, a laptop computer, a cordless phone, a tablet, a gaming device, a wearable device, an entertainment device, a sensor, an infotainment device, Internet-of-Things (IoT) devices, or any device that can communicate via a wireless medium.

In one embodiment, the UEs 150 may communicate with their respective base stations 120 in their respective cells 130. A UE may have more than one serving cell; e.g., UE 150d may have both cell 130b and cell 130a as its serving cells. The transmission from a UE to a base station is called uplink transmission, and from a base station to a UE is called downlink transmission.

In one embodiment, each of the UEs 150 provides layer 3 functionalities through a radio resource control (RRC) layer, which is associated with the transfer of system information, connection control, and measurement configurations. Each of the UEs 150 further provides layer 2 functionalities through a packet data convergence protocol (PDCP) layer, a radio link control (RLC) layer and a medium access control (MAC) layer. The PDCP layer is associated with header compression/decompression, security, and handover support. The RLC layer is associated with the transfer of packet data units (PDUs), error correction through automatic repeat request (ARQ), concatenation, segmentation, and reassembly of RLC service data units (SDUs). The MAC layer is associated with the mapping between logical channels and transport channels, multiplexing of MAC SDUs onto transport blocks (TBs), de-multiplexing of MAC SDUs from TBs, scheduling information reporting, error correction through hybrid ARQ (HARM), priority handling, and logical channel prioritization. Each of the UEs 150 further provides layer 1 functionalities through a physical (PHY) layer, which is associated with error detection on the transport channels, forward error correction (FEC) coding/decoding of the transport channels, interleaving, rate matching, mapping onto physical channels, modulation/demodulation of physical channels, and multiple-input and multiple-output (MIMO) antenna processing, etc.

It is noted that while the disclosed embodiments may be described herein using terminology commonly associated with 5G or NR wireless technologies, the present disclosure can be applied to other multi-access technologies and the telecommunication standards that employ these technologies.

In a 5G NR network, a base station such as a gNB may configure and activate a bandwidth part (BWP) for communication with UEs, through a radio resource control (RRC) configuration according to an RRC layer protocol. The activated BWP is referred to as the frequency resources, and the time scheduled for the communication is referred to as the time resources. The frequency resources and the time resources are herein collectively referred to as the time-and-frequency resources.

Multiple time and frequency configurations are supported by NR. With respect to time resources, a frame may be 10 milliseconds (ms) in length, and may be divided into ten sub-frames of 1 ms each. Each subframe may be further divided into multiple equal-length time slots (also referred to as slots), and the number of slots per subframe may be different in different configurations. Each slot may be further divided into multiple equal-length symbol durations (also referred to as symbols); e.g., 7 or 14 symbols. With respect to frequency resources, NR supports multiple different subcarrier bandwidths. Contiguous subcarriers (also referred to as resource elements (REs)) are grouped into one resource block (RB). In one configuration, one RB contains 12 subcarriers. Multiple contiguous RBs form an "RB set." In one configuration, an RB set is a subband for which an LBT process is performed. A "carrier" as used herein refers to the bandwidth configured for a serving cell. Each of the RE, the RB, the RB set, the subband, and the carrier is a bandwidth unit of a pre-defined bandwidth size in the frequency domain. Although the term "subband" is used throughout the following description, it is understood that the control information may be provided to a UE with respect to the channel availability of any bandwidth unit not limited to a subband. It is also understood that the terms "channel availability" and "frequency domain availability" are used interchangeably in this disclosure.

A BWP may include multiple subbands. A subband may have a bandwidth of 20 MHz or another pre-defined bandwidth. In NR-U, a base station performs an LBT process on each subband in which it intends to transmit a signal. As will be shown in the examples of FIGS. 2A and 2B, an LBT success in a subband is an indication of the channel availability of that subband. An LBT failure in a subband is an indication of that subband being not available. If a base station transmits in a subband when LBT fails in that subband, signals transmitted in that subband can be corrupted and need re-transmission. Depending on the LBT outcome, the available frequency resources for transmission at different times may be different.

Figure 2A:
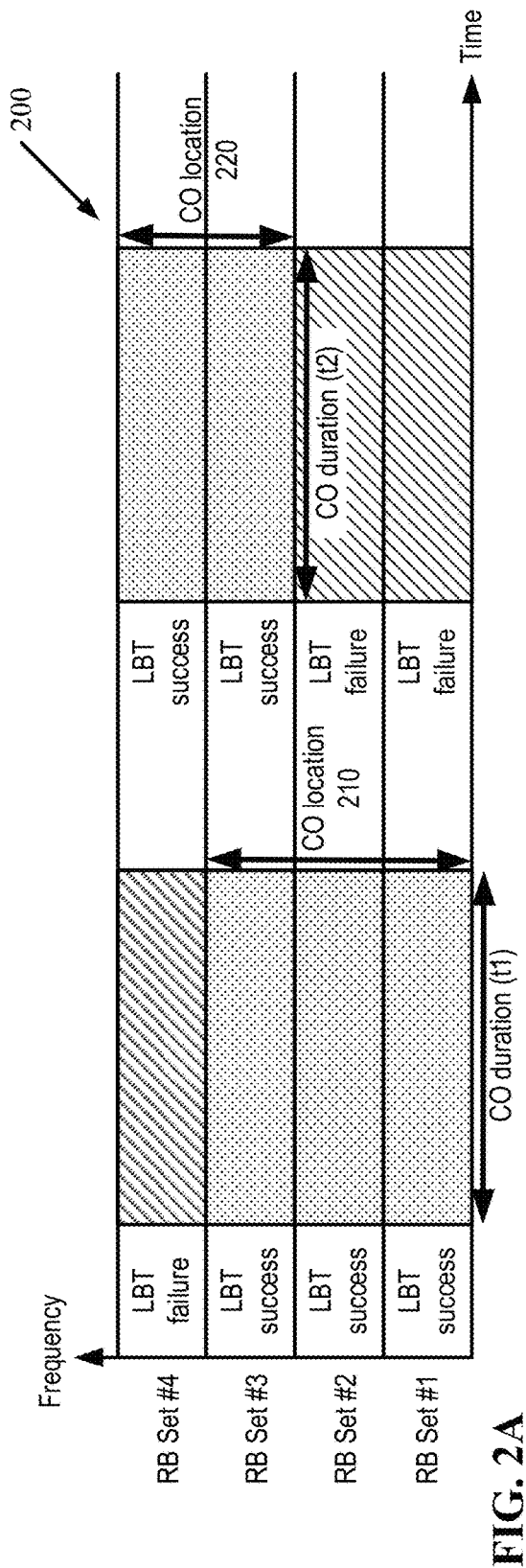
FIG. 2A is a diagram illustrating an example of LBT outcomes according to one embodiment.

FIG. 2A is a diagram 200 illustrating an example of LBT outcomes according to one embodiment. RB sets #1, #2, #3 and #4 represent four bandwidth units of a serving cell. According to the example, LBT succeeds in the channel occupancy (CO) location 210 of RB sets #1, #2 and #3 in a CO duration (t1). Each RB set in this example is a subband for which an LBT process is performed. The CO duration (t1) for all available RB sets of a serving cell starts at the same time and ends at the same time. Furthermore, the example shows that LBT succeeds in the CO location 220 of RB sets #3 and #4 in a CO duration (t2). Similar to t1, the CO duration (t2) for all available RB sets of a serving cell starts at the same time and ends at the same time. Available RB sets may be adjacent or non-adjacent RB sets. A CO location refers to a frequency location, and a CO duration refers to a time duration. In combination, a CO duration and a CO location indicate the time-and-frequency availability for signal transmission and reception.

The embodiments of the invention provide UEs with those CO locations available for reception, such that the UEs may detect downlink signals in those available CO locations and do not need to monitor the unavailable CO locations.

Figure 2B:
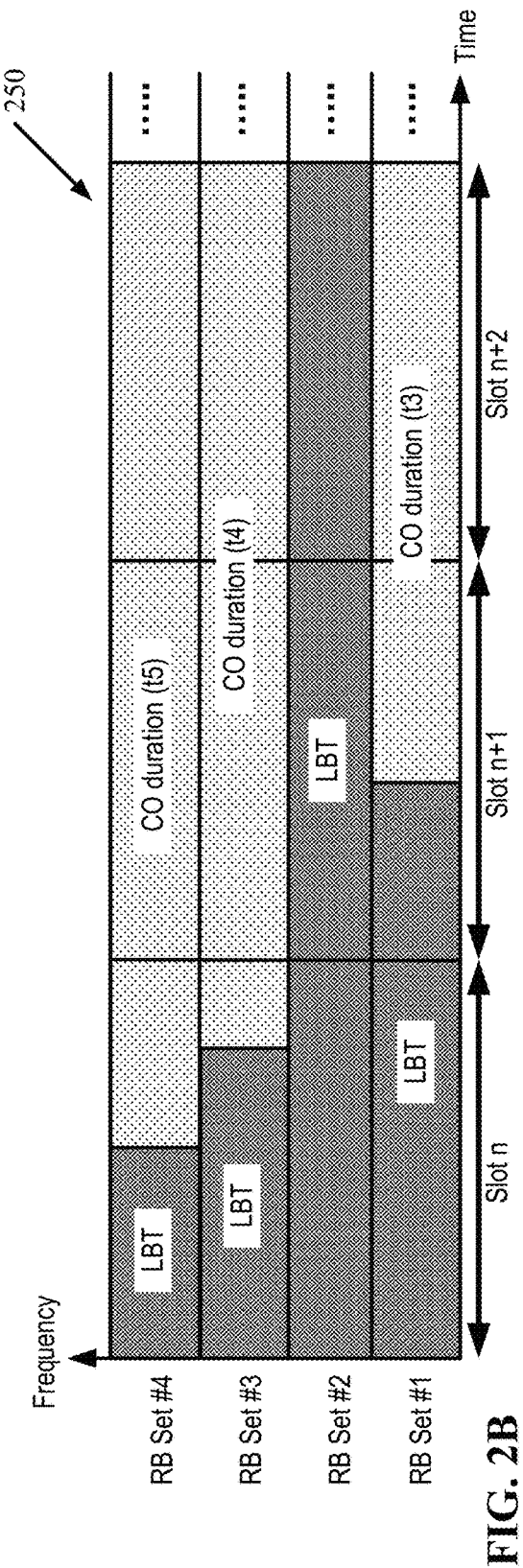
FIG. 2B is a diagram illustrating another example of LBT outcomes according to one embodiment.

FIG. 2B is a diagram 250 illustrating another example of LBT outcomes according to one embodiment. According to the example, the LBT processes for different RB sets may take different amounts of time. Thus, the CO durations for different available RB sets may start at different times. Although not shown in FIG. 2B, in one embodiment, the CO durations for different available RB sets may end at different times.

The LBT outcomes shown in FIGS. 2A and 2B may be communicated as control information from a base station to one or more UEs in downlink control information (DCI). In one embodiment, the control information provides a first duration of channel occupancy of each bandwidth unit of a serving cell; e.g., the CO durations (t3, t4, and t5) in FIG. 2B. In another embodiment, the control information provides a second duration of channel occupancy of a serving cell; e.g., when all of the available bandwidth units share the same CO duration (t1 or t2) such as the example in FIG. 2A.

In one embodiment, the control information may include LBT outcomes for multiple serving cells. In one embodiment, the control information is referred to as the "common control information" when the control information is transmitted in a PDCCH using UE-group common signaling, such as a UE group identified by the same group ID, or the control information is carried in a DCI with cyclic redundancy check (CRC) scrambled by a radio network temporary identifier (RNTI) shared by multiple UEs.

In one embodiment, the RRC configuration provides time-and frequency resources for locating and monitoring the PDCCH. UE may locate the PDCCH based on the information of a control resource set (CORESET) and a search space set. A CORESET is a set of time-and-frequency resources for carrying the PDCCH. A CORESET may be specifically configured to a UE or shared by multiple UEs. A UE performs blind decoding throughout one or more search spaces in the CORESET to locate the UE-specific PDCCH or group-common PDCCH (GC PDCCH) that carries the DCI.

In a channel occupied by a gNB, control information related to channel occupancy is informed to one or more UEs served by the gNB. The control information may include time domain channel occupancy structure (e.g., slot format information (SFI)-index) which indicates transmission directions (uplink, downlink, or flexible) of the time resources configured for one or more serving cells. Furthermore, as disclosed herein, the control information also includes frequency domain channel occupancy structure (e.g., subband/carrier/channel availability information). The control information may further include PDCCH monitoring occasion indications. In some embodiments, the CO-related control information is cell-specific or group-common to multiple UEs. GC PDCCH can be used to deliver the CO-related control information to a UE group to avoid overhead in signaling to multiple UEs. In some embodiments, the CO-related control information may be delivered on a PDCCH which is not limited to a GC PDCCH.

Figure 3:
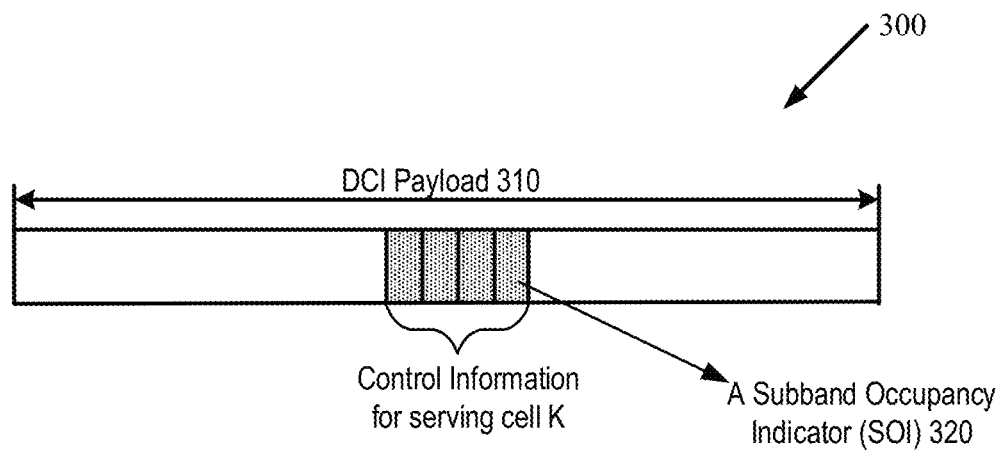
FIG. 3 is a diagram illustrating an example of control information in a downlink control information (DCI) payload according to one embodiment.

FIG. 3 is a diagram 300 illustrating an example of control information in a DCI payload 310 according to one embodiment. In this embodiment, the control information for each subband of a serving cell K is carried in the DCI payload 310. The DCI payload 310 may be transmitted in a PDCCH. In one embodiment, the DCI payload 310 may be transmitted in a GC PDCCH using UE-group common signaling. In one embodiment, the control information for each subband is a subband occupancy indicator (SOI) 320. In one embodiment, each SOI 320 is a 1-bit value indicating whether a corresponding subband of cell K is available for reception by the UEs. In this example, cell K is configured with four subbands and, therefore, the control information for cell K has four SOIs 320. In one embodiment, it may be helpful for the UE to be informed of a duration of channel occupancy of each subband of a serving cell. In this example, the control information for each subband can also indicate a duration.

Figure 4:
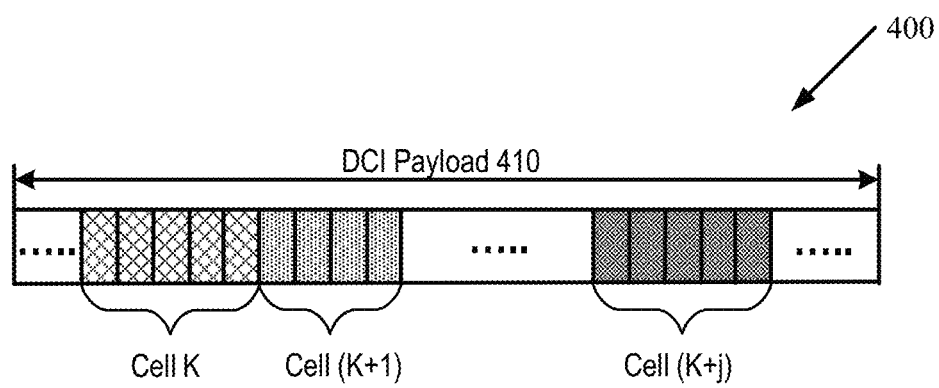
FIG. 4 is a diagram illustrating an example of control information in a DCI payload according to another embodiment.

FIG. 4 is a diagram 400 illustrating an example of control information in a DCI payload 410 according to another embodiment. In this example, the DCI payload 410 contains per-cell control information for multiple serving cells in a wireless network (e.g., the wireless network 100 in FIG. 1), such as cell K to cell (K+j). The DCI payload 410 may be transmitted in a PDCCH. In one embodiment, the DCI payload 410 may be transmitted in a GC PDCCH using UE-group common signaling. Different serving cells may be configured with different numbers of subbands. A UE may have more than one serving cell, and it may be helpful for the UE to be informed of which subbands in which serving cells are available for reception. In one embodiment, the control information for each subband is a 1-bit SOI indicating whether a corresponding subband of a corresponding serving cell is available for reception. In one embodiment, the same control information can be shared by more than one serving cell.

Although the examples of FIGS. 3 and 4 show that the DCI provides per-subband availability information, in alternative embodiments the DCI may provide channel availability information for a bandwidth configured for a serving cell where the bandwidth may be different from a subband.

Figure 5:
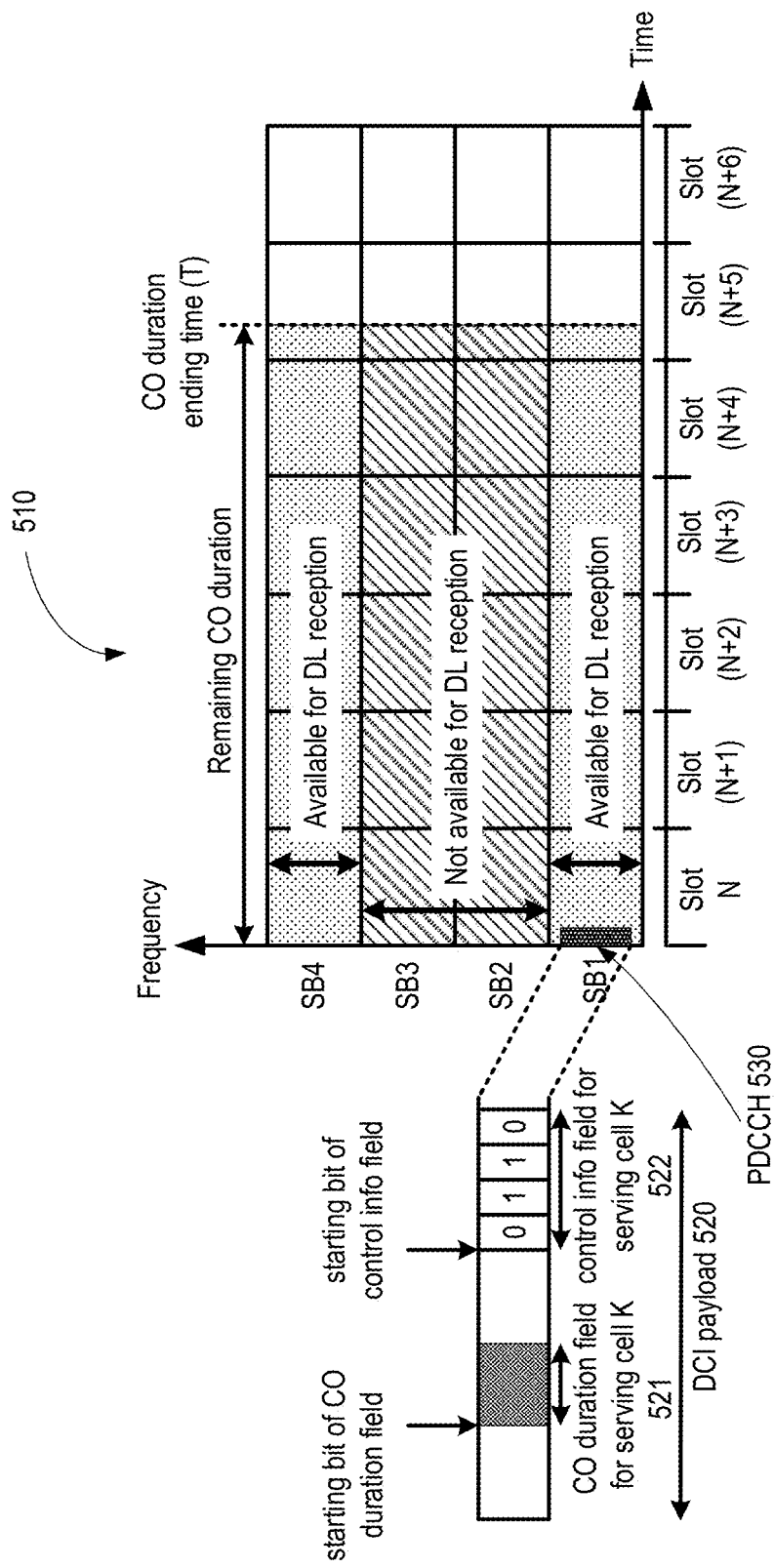
FIG. 5 is a diagram illustrating time-and-frequency resources configured for a cell according to an embodiment.

FIG. 5 is a diagram 500 illustrating time-and-frequency resources 510 configured for a serving cell (e.g., cell K) according to an embodiment. In this example, a base station may use the time-and-frequency resources 510 for signal transmission in cell K, where the time-and-frequency resources 510 in this example include four subbands (e.g., SB1, SB2, SB3, and SB4) in frequency, and seven time slots (e.g., slot N, slot (N+1), . . . , slot (N+6)) in time. According to the outcome of LBT, the base station identifies subbands SB2 and SB3 as unavailable, and subbands SB1 and SB4 as available. The base station can inform the UEs of per-subband availability via the DCI carried in a PDCCH 530. In one embodiment, the PDCCH 530 may be a GC PDCCH.

As an example, the available subband SB1 may contain the PDCCH 530 that carries the DCI. The payload 520 of the DCI includes a CO duration field 521 for cell K and a control information field 522 for cell K. In this example, the control information field 522 is a bit field containing a bitmap that indicates the channel availability of each subband of cell K. From the CO duration field 521, a receiving UE can identify the ending time of the CO duration in the time-and-frequency resources 510 for cell K. The CO duration ending time T marks the expiration time of the control information. That is, the per-subband availability information (in the bitmap) in the DCI payload 520 is valid until the end of the CO duration time T. The bitmap contains a sequence of bits, with each bit indicating the channel availability of a corresponding subband of cell K. In this example, the bitmap includes four bits to indicate the channel availability of SB1, SB2, SB3 and SB4, respectively.

In an alternative embodiment, the bitmap may contain only one indicator; e.g., one bit, for a serving cell. The bit value indicates whether a corresponding carrier for that server cell is available.

In one embodiment, a UE may obtain information of the CO duration field 521 and the control information field 522 from the network via an RRC configuration. For example, parameters of the RRC configuration may include some or all of the following information: the position (e.g., the starting bit) of the CO duration field 521, the position (e.g., the starting bit) of the control information field 522, and the serving cell ID identifying the serving cell for which the CO duration field 521 and the control information field 522 are applicable.

In one embodiment, when the DCI indicates that a subband is unavailable, a UE does not perform any PDCCH monitoring in the subband until the end of the corresponding CO duration. The frequency domain availability information may be updated in a later DCI. A UE may receive a new indication of frequency domain availability for a serving cell in a later DCI.

In one embodiment, for a subband indicated as available by a DCI, the UE performs PDCCH monitoring as it is configured. For a subband indicated as available by a DCI, the UE applies time domain control information conveyed by the DCI to the subband. For a subband indicated as unavailable by a DCI, the UE performs no PDCCH monitoring in the subband. For a subband without a frequency domain availability indication, the UE performs PDCCH monitoring as it is configured. It is noted that the above statements in this paragraph also hold true when the term "subband" is replaced by "carrier," which is the frequency resource configured for a serving cell.

According to the aforementioned embodiments, a PDCCH is configured to provide to UEs an explicit indication of whether one or more carriers and/or subbands are available or unavailable for reception. This indication may be provided for one or more serving cells. The DCI carried in the PDCCH includes a bit field to provide this indication. The indication is valid until the end of the channel occupancy duration indicated by a base station.

According to the aforementioned embodiments, a UE may perform an uplink transmission of a signal or a channel that overlaps with the one or more bandwidth units of the serving cell. The UE may switch from a first type channel access procedure (e.g., a category 4 uplink transmission) to a second type channel access procedure (e.g., a category 2 uplink transmission) for the uplink transmission if the control information indicates that all of the one or more bandwidth units overlapped with the signal or the channel are available. A UE according to the category 4 transmission spends a longer time sensing an uplink channel for availability before transmission than according to the category 2 transmission. A longer sensing time means a higher failure rate for the UE to obtain a clear channel for transmission, because another station may transmit signals during the UE's sensing time. When the UE is informed of the frequency domain availability according to the aforementioned embodiments, the UE may perform a category 2 uplink transmission in a bandwidth that is known to be available, and, therefore, improves its transmission performance.

In some embodiments, when a UE is configured with a channel state information reference signal (CSI-RS) that spans over multiple subbands, any of the subbands is not available for reception, the UE may cancel the reception of the CSI-RS within a corresponding channel occupancy duration. More generally, if the control information indicates that any of the one or more bandwidth units that are overlapped with a downlink signal such as CSI-RS is not available the UE may cancel the reception of the signal within a corresponding channel occupancy duration. Furthermore, if the control information indicates that any of the one or more bandwidth units that are overlapped with a downlink channel such as the PDCCH is not available, the UE may cancel the reception of the channel within a corresponding channel occupancy duration.

Figure 6:
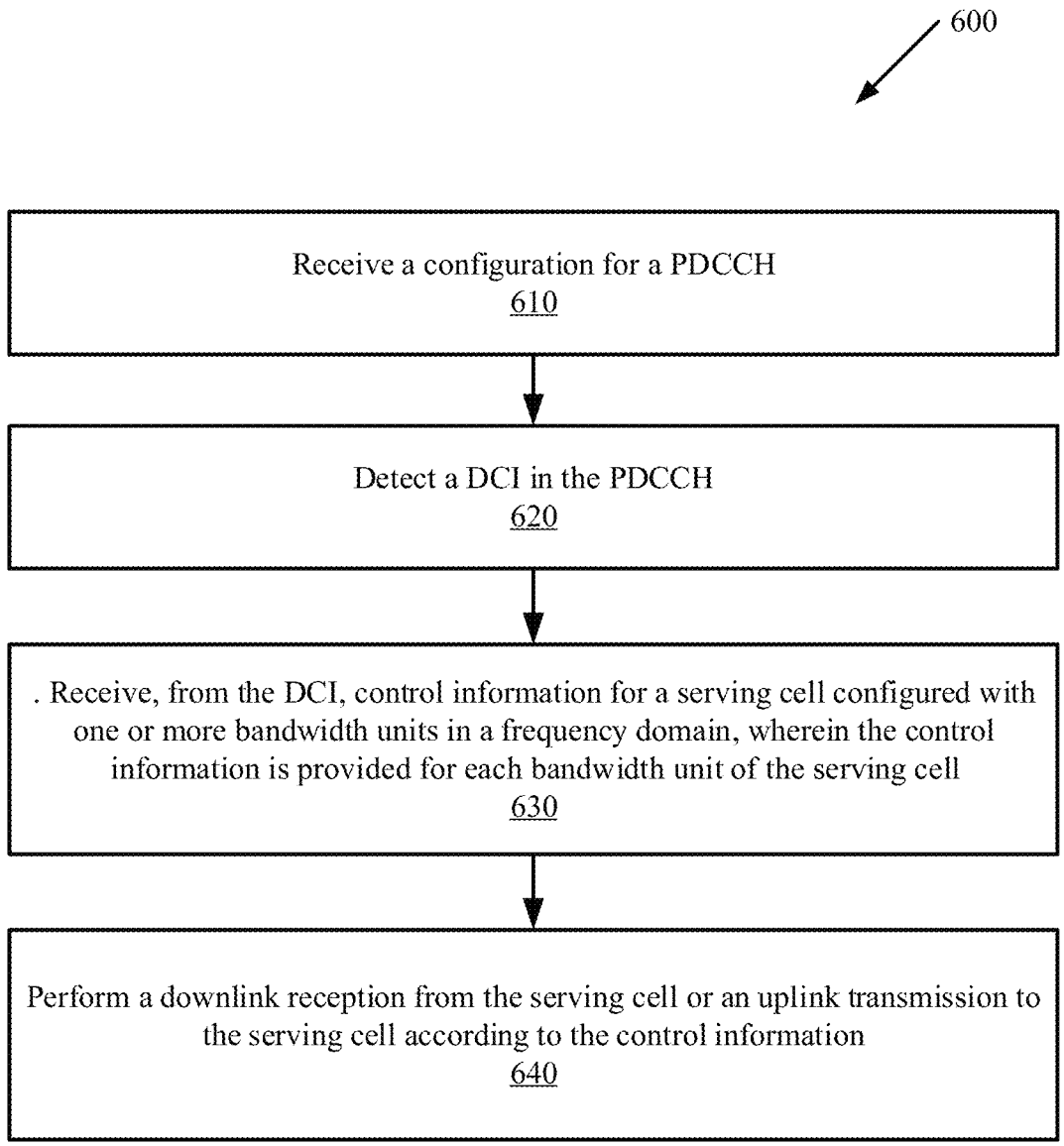
FIG. 6 is a flow diagram illustrating a method for a UE to receive downlink control information according to one embodiment.

FIG. 6 is a flow diagram illustrating a method 600 performed by a UE in a wireless network according to one embodiment. The method 600 starts at step 610 when the UE receives a configuration for a PDCCH. The UE at step 620 detects a DCI in the PDCCH. The UE at step 630 receives, from the DCI, control information for a serving cell configured with one or more bandwidth units in a frequency domain. The control information is provided for each bandwidth unit of the serving cell. The UE at step 640 performs a downlink reception from the serving cell or an uplink transmission to the serving cell according to the control information.

In one embodiment, each bandwidth unit is a subband for which an LBT process is performed by a base station associated with the serving cell to determine channel availability of the subband for signal reception or transmission. In one embodiment, the control information indicates channel availability of each bandwidth unit of the serving cell. In one embodiment, the DCI includes a bit field containing one or more bits, each bit in the bit field indicating channel availability of each bandwidth unit of the serving cell. In one embodiment, the DCI includes a bit field containing one bit indicating channel availability of a carrier configured for the serving cell.

Figure 7:
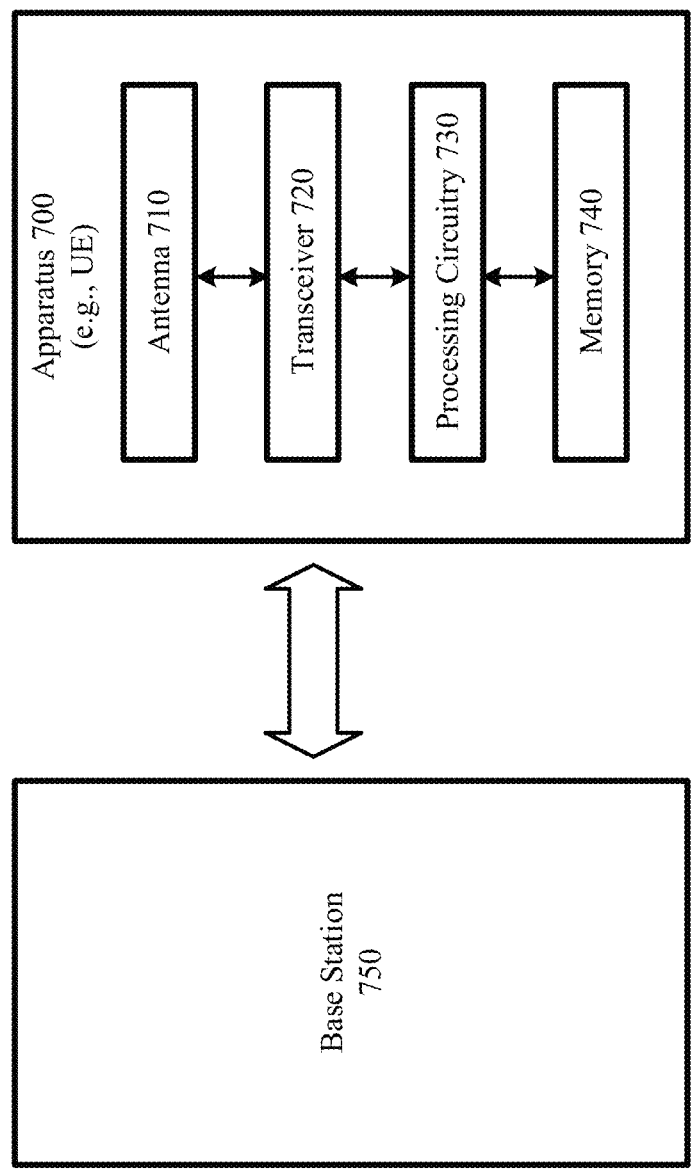
FIG. 7 is a block diagram illustrating an apparatus that performs wireless communication according to one embodiment.

FIG. 7 is a block diagram illustrating elements of an apparatus 700 performing wireless communication with a base station 750 according to one embodiment. In one embodiment, the apparatus 700 may be a UE and the base station 750 may be a gNb or the like, both of which may operate in a wireless network, such as the wireless network 100 in FIG. 1. In one embodiment, the apparatus 700 may be any of the UEs 150 in FIG. 1.

As shown, the apparatus 700 may include an antenna 710, and a transceiver circuit (also referred to as a transceiver 720) including a transmitter and a receiver configured to provide radio communications with another station in a radio access network, including communication in an unlicensed spectrum. The transmitter and the receiver may include filters in the digital front end for each cluster, and each filter can be enabled to pass signals and disabled to block signals. The apparatus 700 may also include processing circuitry 730 which may include one or more control processors, signal processors, central processing units, cores, and/or processor cores. The apparatus 700 may also include a memory circuit (also referred to as memory 740) coupled to the processing circuitry 730. The apparatus 700 may also include an interface (such as a user interface). The apparatus 700 may be incorporated into a wireless system, a station, a terminal, a device, an appliance, a machine, and IoT operable to perform wireless communication in an unlicensed spectrum, such as a 5G NR-U network. It is understood the embodiment of FIG. 7 is simplified for illustration purposes. Additional hardware components may be included.

In one embodiment, the apparatus 700 may store and transmit (internally and/or with other electronic devices over a network) code (composed of software instructions) and data using computer-readable media, such as non-transitory tangible computer-readable media (e.g., computer-readable storage media such as magnetic disks; optical disks; read-only memory; flash memory devices) and transitory computer-readable transmission media (e.g., electrical, optical, acoustical or other forms of propagated signals). For example, the memory 740 may include a non-transitory computer-readable storage medium that stores computer-readable program code. The code, when executed by the processors, causes the processors to perform operations according to embodiments disclosed herein, such as the method disclosed in FIG. 6.

Although the apparatus 700 is used in this disclosure as an example, it is understood that the methodology described herein is applicable to any computing and/or communication device capable of performing wireless communications.

The operations of the flow diagram of FIG. 6 has been described with reference to the exemplary embodiments of FIGS. 1 and 7. However, it should be understood that the operations of the flow diagram of FIG. 6 can be performed by embodiments of the invention other than the embodiments of FIGS. 1 and 7, and the embodiments of FIGS. 1 and 7 can perform operations different than those discussed with reference to the flow diagram. While the flow diagram of FIG. 6 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by a user equipment terminal (UE) in a wireless network, comprising:
   receiving a configuration for a physical downlink control channel (PDCCH);
   detecting downlink control information (DCI) in the PDCCH from a base station;
   receiving, from the DCI, control information for a plurality of serving cells configured with respective numbers of bandwidth units in a frequency domain, wherein the control information indicates channel availability of each bandwidth unit of each serving cell; and
   performing a downlink reception or an uplink transmission in a given bandwidth unit of a given serving cell according to the channel availability indicated in the control information.

2. The method of claim 1, wherein the configuration further provides time-and frequency resources for monitoring the PDCCH.

3. The method of claim 1, wherein each bandwidth unit is a subband for which a listen-before-talk (LBT) process is performed by a base station associated with the given serving cell to determine the channel availability of the subband for reception or transmission.

4. The method of claim 1, wherein the DCI includes a bit field containing one or more bits, each bit in the bit field indicating the channel availability of a corresponding bandwidth unit of a corresponding serving cell.

5. The method of claim 1, wherein the DCI includes a bit field containing one bit indicating the channel availability of a carrier configured for the given serving cell.

6. The method of claim 1, wherein the PDCCH uses UE-group common signaling.

7. The method of claim 1, wherein the control information indicates a first duration of channel occupancy of each bandwidth unit of the given serving cell.

8. The method of claim 1, further comprising:
   receiving, from the DCI, a second duration of channel occupancy of the given serving cell, wherein the control information for the given serving cell is valid until an end of the second duration.

9. The method of claim 1, further comprising:
   receiving, from the configuration, a third duration of channel occupancy of the given serving cell, wherein the control information for the given serving cell is valid until an end of the third duration.

10. The method of claim 1, wherein the configuration further provides a position of a field in the DCI and an identifier of the given serving cell, and wherein the field contains the control information for the given serving cell.

11. The method of claim 1, wherein performing the downlink reception from the given serving cell further comprises:
canceling the downlink reception for a signal or a channel, wherein the signal or the channel overlaps with the one or more bandwidth units of the given serving cell, if the control information indicates that any of the one or more bandwidth units overlapped with the signal or the channel is not available.

12. The method of claim 1, wherein performing the uplink transmission to the given serving cell further comprises:
switching from a first type channel access procedure to a second type channel access procedure for the uplink transmission of a signal or a channel, where the signal or the channel overlaps with the one or more bandwidth units of the given serving cell, if the control information indicates that all of the one or more bandwidth units overlapped with the signal or the channel are available.

13. An apparatus for wireless communication, the apparatus being a user equipment terminal (UE), comprising:
a memory; and
processing circuitry coupled to the memory and configured to:
receive a configuration for a physical downlink control channel (PDCCH);
detect downlink control information (DCI) in the PDCCH from a base station;
receive, from the DCI, control information for a plurality of serving cells configured with respective numbers of bandwidth units in a frequency domain, wherein the control information indicates channel availability of each bandwidth unit of each serving cell; and
perform a downlink reception or an uplink transmission in a given bandwidth unit of a given serving cell according to the channel availability indicated in the control information.

14. The apparatus of claim 13, wherein the DCI includes a bit field containing one or more bits, each bit in the bit field indicating the channel availability of a corresponding bandwidth unit of a corresponding serving cell.

15. The apparatus of claim 13, wherein the configuration further provides a position of a field in the DCI and an identifier of the given serving cell, and wherein the field contains the control information for the given serving cell.

16. A non-transitory computer-readable storage medium comprising instructions which, when executed by a machine, cause the machine to perform a method for wireless communication, the method comprising:
receiving a configuration for a physical downlink control channel (PDCCH);
detecting downlink control information (DCI) in the PDCCH from a base station;
receiving, from the DCI, control information for a plurality of serving cells configured with respective numbers of bandwidth units in a frequency domain, wherein the control information indicates channel availability of each bandwidth unit of each serving cell; and
performing a downlink reception or an uplink transmission in a given bandwidth unit of a given serving cell according to the channel availability indicated in the control information.

* * * * *